F. H. SWEENEY.
DIRECTION INDICATOR FOR VEHICLES.
APPLICATION FILED MAY 10, 1920.
1,352,327.
Patented Sept. 7, 1920.
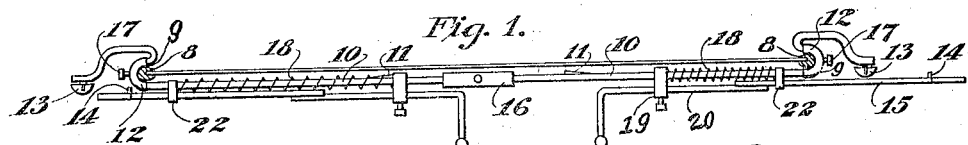
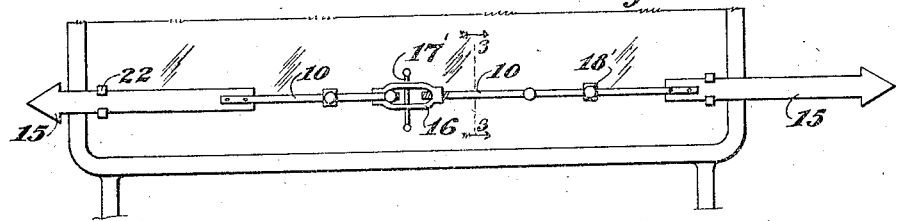
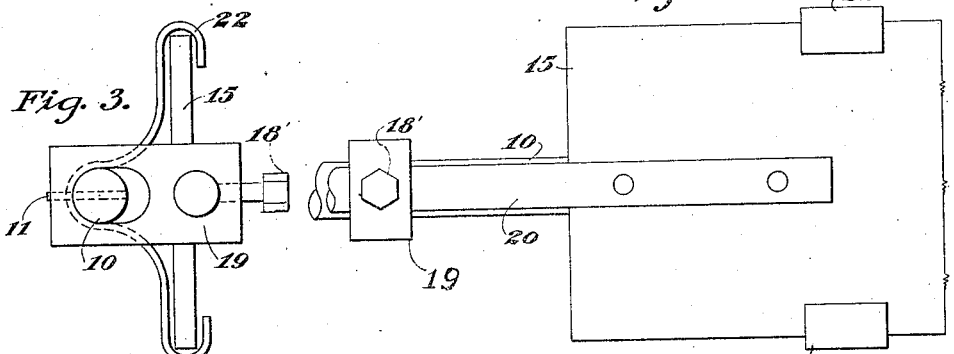
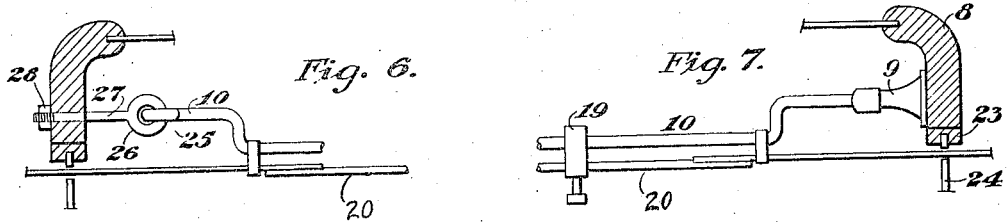
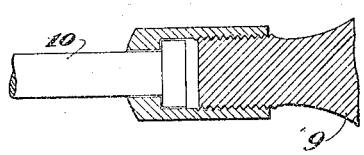
INVENTOR.
Frank H. Sweeney
BY Victor J. Evans
ATTORNEY.

UNITED STATES PATENT OFFICE.

FRANK H. SWEENEY, OF SAN FRANCISCO, CALIFORNIA.

DIRECTION-INDICATOR FOR VEHICLES.

1,352,327.  Specification of Letters Patent.  Patented Sept. 7, 1920.

Application filed May 10, 1920. Serial No. 380,408.

*To all whom it may concern:*

Be it known that I, FRANK H. SWEENEY, a citizen of the United States of America, residing at San Francisco, in the county of San Francisco and State of California, have invented new and useful Improvements in Direction-Indicators for Vehicles, of which the following is a specification.

This invention relates to improvements in direction indicators for vehicles and has particular reference to a manually controlled device which will indicate the direction in which the driver of a vehicle wishes to turn.

An important object of this invention is to provide an apparatus of the above mentioned character, which is adapted to be installed upon or applied to an automobile, without materially altering the construction thereof.

Another object of the invention is the employment of direction indicators which will signal the driver's intention of turning either to the right or to the left and which will operate instantaneously through the medium of tension means upon movement of manually control means.

An additional object of the invention is the employment of audible warning signals which are operated by the direction indicators and which will serve to give warning that a change in direction is to be made by the driver of an automobile.

A still further object of the invention is to provide apparatus of the above mentioned character, which is simple in construction, inexpensive to manufacture, strong, durable and reliable in operation. Other objects and advantages of the invention will be apparent during the course of the following description, In the accompanying drawing forming a part of this specification and in which like numerals are employed to designate like parts throughout the same.

Figure 1, is a plan view of my apparatus applied to the windshield frame of an automobile, Fig. 2, is a front elevation embodying my invention, Fig. 3, is a transverse sectional view taken on line 3—3 of Fig. 2, Fig. 4, is an enlarged detail showing the connecting rod and control arm broken away, Fig. 5, is a side elevation of the means for retaining the indicators in an inoperative position, Fig. 6, is a side elevation partly in section of a modified form of fastening means and one of the connecting rods and showing one of the direction indicators passing through the glass of a door of an inclosed car, Fig. 7, is a side elevation, of still another form of fastening means for one of the connecting rods, Fig. 8, is an enlarged detail partly in section of a modified form of fastening means as shown in Fig. 7.

In the accompanying drawing wherein for the purpose of illustration is shown a preferred embodiment of my invention, numeral 8 designates a frame of a windshield on which are disposed arms or fastening elements 9, which serve as attaching means for connecting rods 10 to the above mentioned frame. These rods 10 have disposed thereon V shaped extensions or stops 11, the purpose of which will be hereinafter described. Rubber tubing or suitable bushing 12 is interposed between fastening elements 9 and the frame 8 of the windshield and serves to prevent a marring of the windshield frame. The arms 9 are bent back upon themselves and support audible signal devices 13, preferably bells, as shown to advantage in Figs. 1 and 2. These signal devices are operated by means of studs 14 formed on direction indicators 15.

Attention is called to the fact that the connecting rods 9 can either be made in one piece or as preferably shown in Figs. 1 and 2 can be connected by turn buckle 16, which serves to join the rods and hold them taut, and will likewise function as means to hold the arms in close engagement with the windshield frame, which arms in applying the same to a vehicle can be slipped over the windshield frame. To further provide against a downward movement of the arms on the windshield frame, a set screw 17 is threaded into the bent portion of the arm at each end thereof and by entering the frame act as a further retaining means to hold the arms 9 in a fixed position on the windshield frame and will function to guard against movement of the arms. The turn buckle 16 is pierced by a double headed pin 17, which will serve, when the machine is jarred to prevent the buckle from turning by virtue of the lower head of the pin being in contact with the windshield frame, and will also function as a means for tightening the turn buckle and increasing the tension of the arms upon the windshield frame.

Provided on the rods 11 and surrounding the same are a pair of suitable stiff coil springs 18 which are attached thereto and co-act with sliding sockets 19, which also encircle the arm 10. The sliding sockets are provided with two openings which receive rods 10 and control arms 20, and likewise have set screws 18' disposed in the top thereof to hold the control arms 20 against lateral movement. These latter arms are suitably connected to direction indicators 15 which are guided in a horizontal plane by virtue of brackets 22.

In the apparatus shown in Figs. 1, 2, 3, 4 and 5, it will be apparent that before the signal indicators 15 are thrown into an operative position, the socket members will be held in position by the stops 11 formed on rods 10, and it will be furthermore evident that upon movement of the control arms 20 the socket members 19 will be disengaged from the stops 11, for the tension coil springs 18 will pull the direction indicators 15 through the guide brackets 22 and draw them outwardly, thus giving a warning of the driver's intention to turn either to the right or to the left. The passage of the indicators 15 in a horizontal direction will also cause the audible signal to be sounded. When it is desired to again turn the signals to an operating position the control arms 20 are grasped by the driver and the indicators will be drawn in and will again pass through the guides until sliding sockets 19 are held fixed by the stops 11 of the rods 10.

The apparatus shown in Figs. 6, 7 and 8 is preferably used on a closed-in car. The difference in structure in these modified forms relates only to the fastening means for attaching the rods to the side of a vehicle, and as the same mechanism is employed as has been described before, no detail description will now be rendered.

In broadly describing, however, the modified forms of fastening means for the rods, a door section is designated by numeral 23, which is disposed adjacent a glass panel 24 of a closed-in car through which indicators 15 pass. In Fig. 6 there is set forth another form of fastening element with a hook arm 25 of the rod 10 engaged in an eye 26 of an eye bolt 27, which in turn is held in position on the windshield frame 8 by means of a nut 28. While in Figs. 7 and 8 the detail of the flange element is illustrated and there is shown to advantage a simple form of retaining means for the enlarged head of the rod 10.

It is to be understood that the forms of my invention herewith shown and described are to be taken as a preferred example of the same, and that various changes in the shape, size, and arrangement of parts may be resorted to without departing from the spirit of the invention or the scope of the subjoined claims.

Having thus described the invention I claim:—

1. A device of the character described comprising a pair of rods having means for attachment to a vehicle, means connecting said rods to hold the same taut, direction indicators connected to and slidably mounted on said rods, manually control means connected to said direction indicators, and means for guiding said direction indicators in a horizontal plane.

2. A device of the character described comprising a pair of rods having means for attachment to a vehicle, means for connecting said rods to hold the same taut, direction indicators connected to and slidably mounted on said rods, tension means on said rods to control the sliding movement of said direction indicators to draw the same into an operative position, manually control means connected to said direction indicators, and means for guiding said direction indicators.

3. A device of the character described comprising a pair of bars having means for attachment to a vehicle, a turn buckle connecting said rods to hold the same taut, a double headed pin penetrating the turn buckle and preventing the turning of the same by having its lower head contacting with windshield of said vehicle, direction indicators connected to and slidably mounted on said rods, tension means on said rods to control the sliding movement of said direction indicators to draw the same into operative position, manually control means connected to said direction indicators and means for guiding the said direction indicators in a horizontal plane.

4. A device of the character described comprising a pair of rods having means for attachment to a vehicle, means for connecting said rods to hold the same taut, control arms lying in the same plane as that of said rods, sliding sockets connecting said rods and said arms, direction indicators attached to said arms, stops on said rods to hold said indicators in a fixed position, tension means encircling said rods and attached thereto to draw said direction indicators into operative position, and means for guiding said direction indicators.

5. A device of the character described comprising a pair of rods having means for attachment to a vehicle, a turn buckle connecting said rods to hold the same taut, supporting means forming a continuation of said first mentioned means, an audible signal supported by said last mentioned means, control arms lying in the same plane as that of said pair of rods, sliding sockets connecting said rods and said arms, direction indicators attached to said arms and provided with a stud to contact with said audible signal, stops on said rods to hold said indicators in a fixed position, tension means attached to said rods to draw said through indicators into an operative position, and means guiding said direction indicators.

6. A device of the character described comprising a pair of rods having fastening elements for attachment to the windshield of a vehicle, a bushing interposed between said arms and said windshield frame, supporting means connected to the fastening elements and forming a continuation thereof, an audible signal supported by said last mentioned means, a turn buckle connecting said rods to hold the same taut, control arms lying in the same plane as that of said pair of rods, sliding sockets connecting said rods and said arms, direction indicators attached to said arms and provided with a stud portion to contact with and sound said audible signal, stops on said rods to hold said indicators in a fixed position, tension means attached to said rods to throw said direction indicators into operative position, and means for guiding said direction indicators.

7. A device of the character described comprising a pair of angular rods having fastening elements for attachment to a vehicle, a turn buckle connecting said rods to hold the same taut, said fastening elements including flanged sockets for receiving ends of said rods, control arms lying in the same plane as that of said pair of angular rods, sliding sockets connecting said rods and said arms, direction indicators attached to said arms, stops on said rods to hold said indicators in a fixed position, tension means attached to said rods to draw said direction indicators into operative position, and means for guiding said direction indicators horizontally through a portion of said vehicle.

8. A device of the character described comprising a pair of angular rods, terminating in hooked ends, fastening elements connected to said rods for attaching the same to a vehicle, said fastening elements including an eyelet bolt extending through the frame of said vehicle to receive the hooked ends of said rods, a turn buckle connecting said rods to hold the same taut, control arms lying in the same plane as that of said pair of rods, sliding sockets connecting said rods and said arms, direction indicators attached to said arms, stops on said rods to hold said indicators in a fixed position, tension means attached to said rods to release the sliding sockets from said stops on movement of said control arms to thus throw said direction indicators into operative position, and means for guiding said direction indicators horizontally through a portion of said vehicle.

In testimony whereof I affix my signature.

FRANK H. SWEENEY.